United States Patent
Wong

(10) Patent No.: US 6,542,547 B1
(45) Date of Patent: Apr. 1, 2003

(54) EFFICIENT HEURISTIC BASED MOTION ESTIMATION METHOD FOR VIDEO COMPRESSION

(75) Inventor: Yiwan Wong, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1348 days.

(21) Appl. No.: 08/967,251

(22) Filed: Nov. 5, 1997

Related U.S. Application Data

(63) Continuation of application No. 08/452,732, filed on May 30, 1995, now abandoned.

(51) Int. Cl.[7] .................................................. H04N 7/18
(52) U.S. Cl. .................................................. 375/240.17
(58) Field of Search .......................... 348/699, 701, 348/700, 455, 444, 451, 415, 416, 411, 413, 412, 409; 375/240.09, 240.1, 240.11, 240.12, 240.13, 240.14, 240.15, 240.16, 240.17

(56) References Cited

U.S. PATENT DOCUMENTS

| | | | | |
|---|---|---|---|---|
| 5,557,341 A | * | 9/1996 | Weiss et al. | 348/699 |
| 5,600,377 A | * | 2/1997 | David et al. | 348/452 |
| 5,706,059 A | * | 1/1998 | Ran et al. | 348/699 |

OTHER PUBLICATIONS

Kan Xie, et al., "A New Block–Based Motion Estimation Algorithm", Signal Processing: Image Communication, vol. 4, No. 6, Nov. 1992, pp. 507–517.

Joon–Seek Kim, et al., "Local Motion–Adaptive Interpolation Technique Based on Block Matching Algorithms", Signal Processing: Image Communication, vol. 4, No. 6, Nov. 1992, pp. 519–528.

Tero Koivunen, "Motion Detection of an Interlaced Video Signal", IEEE, THPM 21.3, pp. 344–345.

* cited by examiner

Primary Examiner—Andy Rao
(74) Attorney, Agent, or Firm—W. Daniel Swayze, Jr.; W. James Brady; Frederick J. Telecky, Jr.

(57) ABSTRACT

A heuristic based motion estimation system and method for video compression may include: defining the target block 70; defining a simplified signature block 72; searching the reference frame using the simplified signature block 74; searching for the best match in the area centered around the location of the target block in the reference frame using the simplified signature 76; computing the sum of the absolute pixel-by-pixel difference using motion vectors of the target block's neighbors and a zero motion vector 78; selecting a new block with a motion vector with the minimum sum of the absolute pixel-by-pixel difference 80; and searching adjacent neighbors of the new block for minimum absolute difference match 82.

9 Claims, 3 Drawing Sheets

EFFICIENT HEURISTIC BASED MOTION ESTIMATION METHOD FOR VIDEO COMPRESSION

This application is a Continuation, of application Ser. No. 08/452,732 filed on May 30, 1995, now abandoned.

FIELD OF THE INVENTION

This invention generally relates to video compression.

BACKGROUND OF INVENTION

One of the most computation intensive functions in a video encoder system is the estimation of the translational motion (motion estimation) for each of the pixel blocks in a picture frame with respect to a previous or a future picture frame, in order to exploit the temporal redundancy in a frame sequence. The sole objective of motion estimation (ME) in video encoding is to exploit the temporal redundancy in a video sequence so as to improve the coding efficiency. The premise is that most of the objects in a scene move translationally across consecutive picture frames and hence, by locating the best matching pixel block in a previous or a future picture frame (reference frame), the information content of a block of pixels in a frame (target frame) can be coded by the pixel difference between the target block and the matching block, and the motion vector (MV), which is the relative location of the target and matching pixel blocks. This approach can substantially improve the coding efficiency of a video encoder system.

A straight-forward approach for ME is called full-search where all the pixel locations within a designated search range in the reference frame, centered around the location of the target block, are searched exhaustively for the best match. A commonly used best-matching criterion is minimum absolute difference (MAD), e.g., the sum of the absolute pixel-by-pixel difference (SAD) between the target block and the block at a matching location on the reference frame should be minimized. Although full-search ME produces high quality MVs, it requires prohibitively large amount of computations for video sequence of normal frame rate and size.

SUMMARY OF THE INVENTION

Hence, a more efficient ME algorithm is needed if a cost-effective video encoder system is to be built. The alternative motion estimation method of the invention is much more efficient than the full-search approach, yet produces close to full-search quality motion vectors. The present invention comprises a heuristic-based ME method. This ME method provides a substantial increase in speed over the full-search method, yet produces MVs that are close to the quality of a full-search.

The novel method includes: defining the target block; defining a simplified signature block; searching the reference frame using the simplified signature block; searching for the best match in the area centered around the location of the target block in the reference frame using the simplified signature; computing the sum of the absolute pixel-by-pixel difference using motion vectors obtained previously for the target block's neighbors and the zero motion vector; selecting a new block with a motion vector with the minimum sum of the absolute pixel-by-pixel difference; and searching adjacent neighbors of the new block for minimum absolute difference match.

BRIEF DESCRIPTION OF THE DRAWINGS

In the drawings.

Corresponding numerals and symbols in the different figures refer to corresponding parts unless otherwise indicated.

DETAILED DESCRIPTION OF THE PREFERRED EMBODIMENTS

Figure 1:
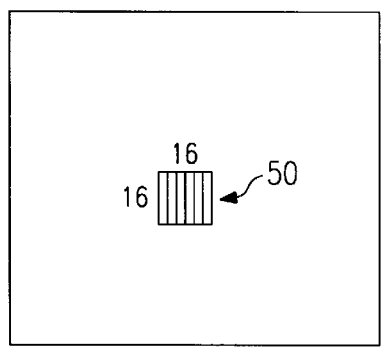
FIG. 1 is a diagram of a target frame.

In the preferred embodiment as illustrated by FIG. 1, a target block 50 of N by N pixels is demonstrated. (This target block may be obtained from one frame of a motion picture or a video.) While the invention applies to N of any reasonable value, for simplicity, the commonly used value for N, 16, will be used in the preferred embodiment. However, the target block size and shape is defined by the coding standard used and thus, may be different from the size and shape of the example in the preferred embodiment. In addition, depending on the capturing device, video pictures can either be in frame (progressive) or field (interlace) format. Heretofore, "picture frame" is used in a generic sense to represent pictures of either field or frame format.

In this embodiment, "R" and "r" corresponds to the number of pixel lines (rows), "C" and "c" corresponds to the number of pixel columns, Sr corresponds to the row search range and Sc corresponds to the column search range. Hence, the number of locations to search per target block is Sr*Sc, which is also taken to be the per frame search window size for the other ME methods.

Figure 2:
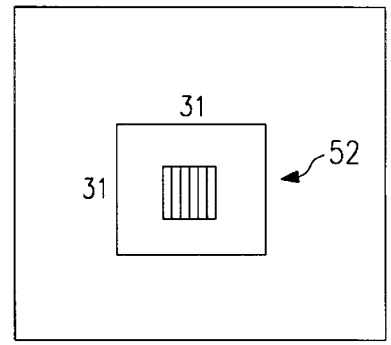
FIG. 2 is a diagram of a reference frame.
Figure 3:
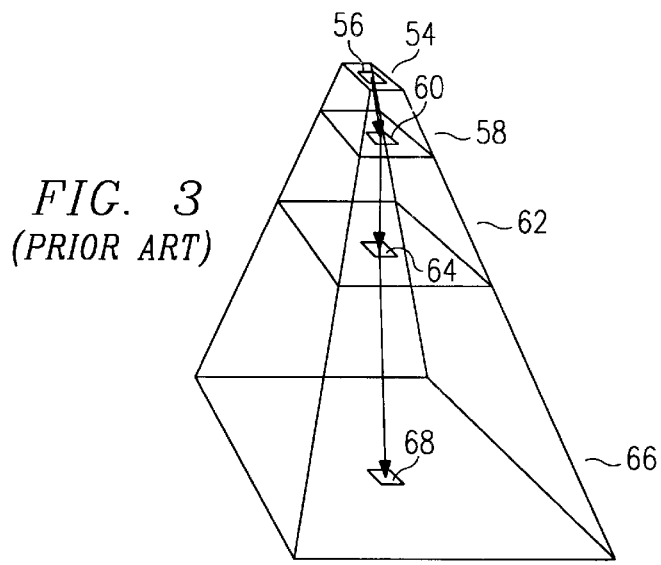
FIG. 3 is a diagram of a hierarchical search.
Figure 4:
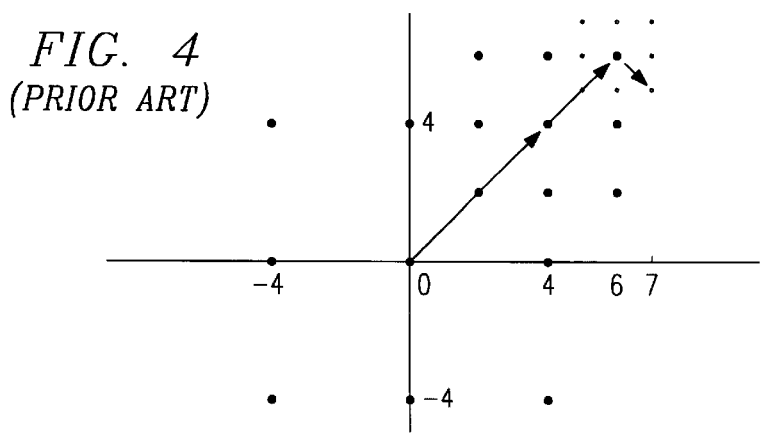
FIG. 4 is a diagram of a multi-step search.

The per frame computation complexity of the full-search ME is given by:

no. of target block=$R/16*C/16$ no. of search loc/target block=$Sr*Sc$ no. of operations for testing 1 match loc = $SAD(16)$ $$\Rightarrow \text{total operations per frame} = \frac{R*C*Sr*Sc}{256} SAD(16)$$

where SAD(n) represents the number of operations required to compute the SAD (sum of absolute difference) for pixel blocks of size n by n (normally, $2*n*n$ equivalent additions). For example, for standard resolution digital television in the United States, R=480, C=704, Sr=Sc=31 (e.g. +/−15), the number of operations per frame (at ⅓₀ sec) is approximately: 1.27E+6*SAD(16), or, if we assume each SAD(16) to be equivalent to 256*2 adds, 1.95E+10 additions/sec. This example is illustrated by the target frame depicted in FIG. 1, the 16×16 target block 50 and the search location/target block 52 depicted in FIG. 2. Such a high operation count poses a tough challenge to real-time ME hardware realization, especially a cost-effective one.

Heuristic-based Motion Estimation

The basic objective of ME is to find the best match between a target block and the pixel blocks inside a search area on the reference frame. The high computation overhead associated with the full-search algorithm comes from two factors:

1). the large number of search locations to check; and
2). the large number of operations to perform per each of these search locations.

Existing fast techniques (such as hierarchical search and multi-step search) for ME focus on reducing only the number of search locations, but not the number of operations needed per search location. As a result, in order to achieve the necessary speedup for a practical implementation, these fast techniques have to adopt very aggressive schemes to reduce the number of search locations. Consequently, the quality of the motion vectors suffers.

The heuristic-based approach for ME, will reduce both the number of search locations (via two-step search) as well as the number of operations to perform per search location. Thus supporting a very high speedup factor with respect to full-search while maintaining the quality of the MVs close to the quality of a full-search.

For each 16×16 target pixel block, an unique "signature" can be defined for use by ME to match a signature of pixel blocks within the search area on the reference frame. In full-search, and many other ME techniques, the signature used is the actual 16×16 pixel matrix—an exact signature of 256 components which requires a high computation cost to match with others. In the hierarchical search, the signature is a subsampled (possibly enlarged) version of the original pixel block. Subsampling improves the efficiency of ME because of the reduced number of search locations to check, and possibly a shorter signature to compare. However, the reliability of these signatures is questionable since more than half of the pixel points in the block are not taken into account and unrelated pixel points from surrounding blocks are included in generating the signature.

In the approach of the present invention, a simplified signature of a block is to be generated from all the pixels in that block, but with a smaller number of components than the signature used in full-search. Hence, the reliability of the signature is lower than full-search, but the efficiency of the ME algorithm will be improved. The present invention uses the row and column sum of pixels as the signature of a pixel block. Let p(i,j) be the pixel values in a 16×16 block. Then the signature of the block is given by the two vectors: Pr(O . . . 7) and Pc(O . . . 7) where:

$$Pr(k) = \sum_{j=0}^{7} [p(2k, 2j) + p(2k+1, 2j)] \text{ and}$$

$$Pc(k) = \sum_{i=0}^{15} p(i, 2k+1)$$

$$Pr(k) = \sum_{j=0}^{7} [p(2k, 2j+1) + p(2k+1, 2j+1)] \text{ and}$$

$$Pc(k) = \sum_{i=0}^{15} p(i, 2k)$$

depending on whether the column number of the upper right hand corner of a reference block is even or odd. The advantages of this scheme are:

1). all pixel points contribute to the signature;
2). only 16 values (1/16 of original) are needed to represent a block=>a factor of 16 decrease in number of operations to perform at each search location;

3). signature values for overlapping 16×16 blocks in the reference area can be updated with only a small number of operations.

The ME method of the present invention finds the motion vectors in two steps: determination of a probable match location, then search in a small neighborhood surrounding the match location for the best match (e.g. two pixels around the match location).

Figures 5, 6:
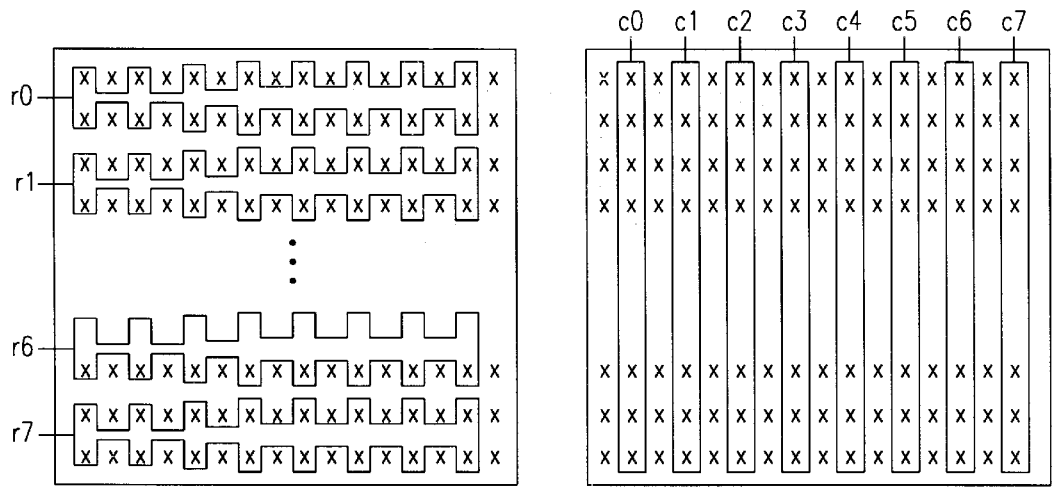
FIGS. 5 and 6 are diagrams of the heuristic-based motion estimation method of the preferred embodiment.

During the first step, simplified signatures will be used to determine the initial best matching search location. To reduce the number of search locations to be checked, only locations on every Kr-th row and every other Kc-th column will be checked. FIG. 5 illustrates the computation of the row sum for the simplified signature (Pr(0) is r0, Pr(1) is r1, . . . ). Similarly, FIG. 6 illustrates the computation of the column sum for the signature (Pc(0) is c0, Pc(1) is c1, . . . ). This heuristic is based on the assumption that the simplified signatures of partially overlapping reference blocks vary smoothly. Unlike the hierarchical search where matching is done on target and reference space, which are both subsampled, this heuristic step uses the original target block, but checks only a subset of the reference locations for best matches.

Since a good match between the simplified signatures is not always the most reliable indication of a most probable match location, two other heuristics are used. The first heuristic is that a pixel block usually moves in the same direction as other surrounding blocks. Hence, an adjacent neighbor block's MV may be a better candidate than the one found with the simplified signature heuristic. In the method of the present invention, MVs from the neighbors on top and to the left of the target blocks are used as probable candidates. Second, in many occasions, a target block does not have much movement across frames (i.e. a zero MV is a good match).

Based on these heuristics, sums of absolute differences are computed for four MVs: the one found by simplified signature matching, two from neighboring blocks, and the (0, 0) vectors. The location with the minimum absolute error will be selected for the next searching step.

Once the best matching search location has been determined, a full-search (with full-signature) will be performed in the −1/+1 neighborhood surrounding this location to find the best match.

The computation overhead of this scheme is:

For the reference blocks (no. of equivalent adds):

$$\text{column signature per frame} = 16C + (R - 16) * (2C)$$
$$\text{row signature per frame} = 16R + (C - 2) * (3R)$$
$$\Rightarrow \text{total} = 5R * C + 10R - 16C$$

For one target block (no. of equivalent adds):

$$\text{column signature} = 128$$
$$\text{row signature} = 128$$
$$\Rightarrow \text{total} = 256 = SAD(16)/2$$
$$\text{Number of search location/target block} = (Sr * Sc)/(Kr * Kc)$$
$$\text{Comparison/search location} = 16 * 2 = SAD(16)/16$$
$$\text{Selection of most probable match location/target block} = 4 * SAD(16)$$
$$\text{Final } -1/+1 \text{ full search/target block} = 8 * SAD(16)$$

Therefore, total number of operations per frame is $$= \frac{R*C}{256} * \left[25/2 + \frac{(Sr*Sc)}{16*Kr*KC}\right] * SAD(16) + (5R*C + 10R - 16C)$$

$$= \frac{R*C}{256} * \left[25/2 + \frac{(Sr*Sc)}{16*Kr*KC} + \frac{256*(5R*C + 10R - 16C)}{R*C*SAD(16)}\right] * SAD(16)$$

Since SAD(16) is equivalent to 512 additions and R (C) is much larger than 8 (5), the last product term inside the summation can be approximated by 5/2 and hence:

$$= \frac{R*C}{256} * \left[15 + \frac{(Sr*Sc)}{16*Kr*Sc}\right] SAD(16)$$

Since total operation count for full search is $$\frac{R*C}{256} * (Sr*Sc) * SAD(16)$$

Therefore, speed up factor of the proposed method is $$\frac{1}{15/(Sr*Sc) + 1/(16*Kr*Kc)}$$

which is bounded from above by 16*Kr*Kc.

In practice, since the target and reference frames are not necessarily adjacent to each other, it will be necessary to increase the search range (Sc and Sr) linearly with respect to the frame distance between the target and reference. Most other ME techniques use a telescopic approach when the frame distance between the target and reference is greater than zero, so as to keep the search range constant. The present invention uses a technique that can be used in either the same telescopic search mode, with the speed up factor as shown above, or a mode that lets the search range grow proportionally to the frame distance, and with the speed up factor as:

=>upperbound=16*Kr*Kc/(Fd*Fd)

where Fd is the average distance between the target and reference frame. The most commonly used frame distances between target and reference are from 0 to 2. In such a case, Fd has the value of 1.8.

Figure 7:
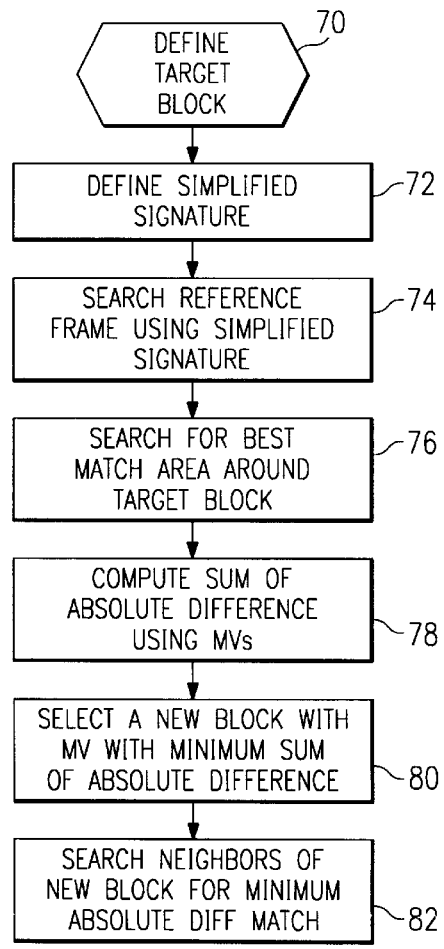
FIG. 7 is a flow diagram of the method of the preferred embodiment.

Furthermore, FIG. 7 shows a flow diagram of procedure of the preferred embodiment. The preferred embodiment includes: in stage 70, defining the target block; in stage 72, defining a simplified signature block; in stage 74, searching the reference frame using the simplified signature block; in stage 76, searching for the best match in the area centered around the location of the target block in the reference frame using the simplified signature; in stage 78, computing the sum of the absolute pixel-by-pixel difference using motion vectors of the target block's neighbors and a zero motion vector; in stage 80, selecting a new block with a motion vector with the minimum sum of the absolute pixel-by-pixel difference; and in stage 82, searching adjacent neighbors of the new block for minimum absolute difference match.

Simulation runs of the ME method of the present invention were run using frame sequences distributed by the Motion Picture Expert Group (MPEG) for testing the MPEG video compression techniques. Quality of the generated MVs is measured by the signal to noise ratio (SNR) of the encoded bit stream using the MPEG-2 test model encoder (TM4). A comparison of these SNR values are made with that of the MVs produced by telescopic full-search.

Test conditions:
    start frame=O, # frames=33, frame size=480×704;
    frame block=16×16, search range=−15/15, −15/15;
    search loc sub-sampling factor=(4, 4); and
    search range mode=scale linearly with frame distance (e.g. non-telescopic)

Search loc sub-sampling factor corresponds to the value of (Kr, Kc). Speedup of ME method of the present invention with respect to the telescopic full search under these conditions is approximately 35.

| | Y | | | | |
|---|---|---|---|---|---|
| Subject/ Method | BICYCLE | CHEER LEADER | FLOWER | MOBILE | TENNIS |
| Telescopic | 28.115 | 29.406 | 30.236 | 27.861 | 27.374 |
| Heuristic ME | 27.901 | 29.244 | 30.048 | 27.765 | 27.435 |
| Difference | −0.214 | −0.162 | −0.188 | −0.096 | +0.061 |

| | Cb | | | | |
|---|---|---|---|---|---|
| Subject/ Method | BICYCLE | CHEER LEADER | FLOWER | MOBILE | TENNIS |
| Telescopic | 34.725 | 31.112 | 33.234 | 33.807 | 40.592 |
| Heuristic ME | 34.532 | 30.930 | 33.120 | 33.750 | 40.675 |
| Difference | −0.193 | −0.182 | −0.114 | −0.043 | +0.083 |

| | Cr | | | | |
|---|---|---|---|---|---|
| Subject/ Method | BICYCLE | CHEER LEADER | FLOWER | MOBILE | TENNIS |
| Telescopic | 36.040 | 32.582 | 34.582 | 33.930 | 39.822 |
| Heuristic ME | 35.858 | 32.373 | 34.890 | 33.857 | 39.839 |
| Difference | −0.182 | −0.209 | −0.079 | −0.073 | +0.017 |

As can be noted from the above results, the heuristic-based ME algorithm introduces less than −0.25 dB degradation to the quality of the encoded output for all cases. These runs confirmed the effectiveness of the heuristic-based ME algorithm. Moreover, a higher speedup factor can be achieved by using a larger value for (Kr, Kc), at the cost of a higher degradation in the SNR.

Figure 8:
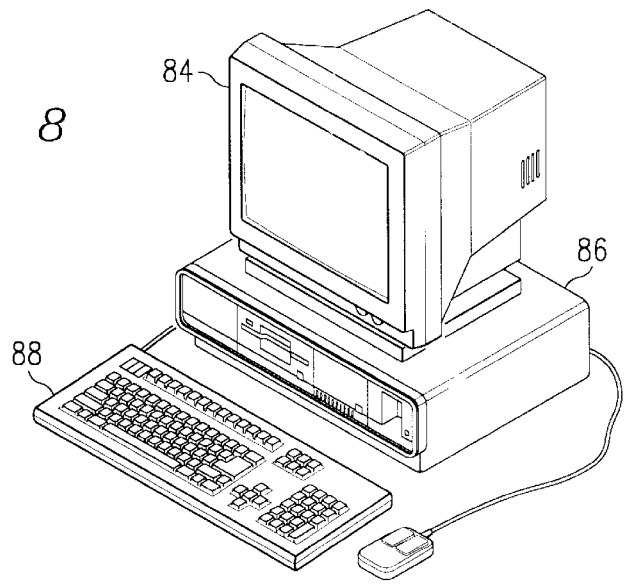
FIG. 8 is a diagram of a personal computer.

In addition, FIG. 8 depicts an example of a personal computer which could be used to execute the heuristic-based algorithm of the present invention. FIG. 8 depicts a monitor 84, a personal computer 86, and a keyboard.

Figure 9:
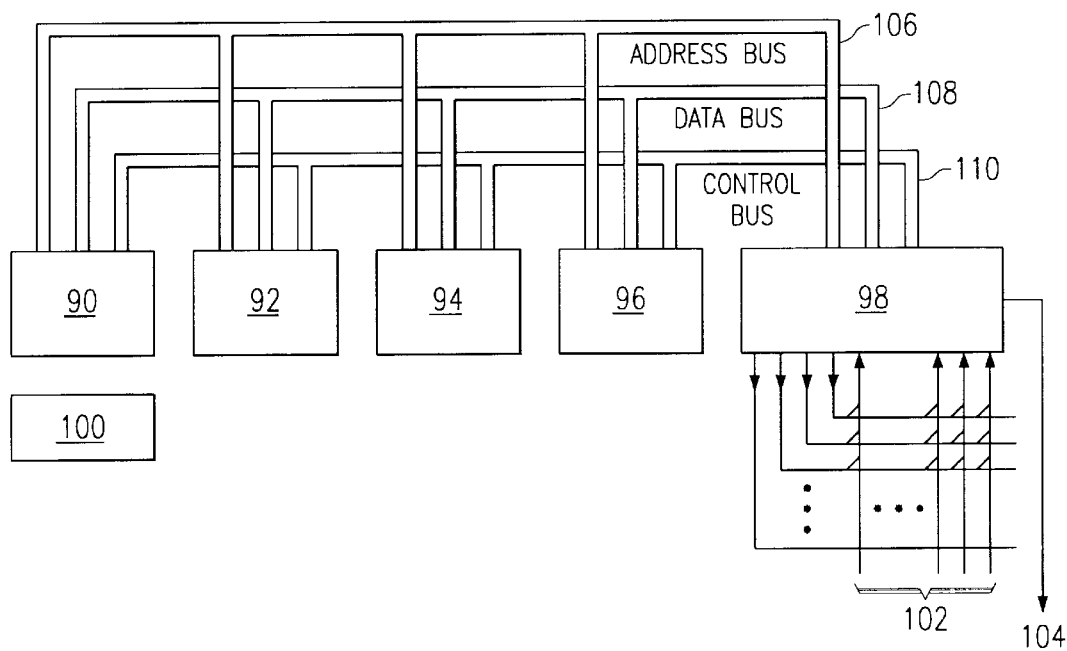
FIG. 9 is a block diagram of a personal computer.

Furthermore, FIG. 9 shows an example of a block diagram of a general purpose computer. The address bus 106, the data bus 108, and the control bus 110 are all connected to the CPU 90, the control circuits 92, the ROM 94, the RAM 96, and peripheral devices 98. The peripheral devices are then connected to a keyboard 102 and other misc. peripherals 104. The power supply 100 would provide power to the entire system. This is just one example of the various implementations of a general purpose computer. Other implementations of genaral purpose or specific purpose computers could be used with the invention.

A few preferred embodiments have been described in detail hereinabove. It is to be understood that the scope of the invention also comprehends embodiments different from those described, yet within the scope of the claims. Words of inclusion are to be interpreted as nonexhaustive in considering the scope of the invention. It should be understood that various embodiments of the invention can employ or be embodied in hardware, software or microcoded firmware. Process diagrams are also representative of flow diagrams for microcoded and software based embodiments.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A heuristic based motion estimation method for video compression, said method comprising the steps of:

defining a target block in a video clip;

defining a simplified signature block from said target block, said simplified signature block being based on a row and column sum of pixels only within said target block;

searching a reference frame using said simplified signature block;

searching for a best match in an area centered around said target block in said reference frame using said simplified signature block;

computing a sum of an absolute pixel-by-pixel difference using motion vectors of said area and a zero motion vector;

selecting a new block with a motion vector with a minimum sum of said absolute pixel-by-pixel difference; and searching a new area centered around said new block for a minimum absolute difference match.

2. The method of claim 1, wherein said step of defining said simplified signature block includes the step of calculating a row sum of pixels of said target block.

3. The method of claim 1, wherein said step of defining said simplified signature block includes the step of calculating a column sum of pixels of said target block.

4. The method of claim 1, said method further including the step of computing a sum of an absolute pixel-by-pixel difference using motion vectors of a neighbor above and a neighbor left of said target block.

5. The method of claim 4, wherein said step of selecting a new block includes the step of selecting a new block among said neighbor above and said neighbor left of said target block.

6. A heuristic based motion estimation method for video compression, said method comprising the steps of:

defining a target block in a video clip;

defining a simplified signature block from said target block, said simplified signature block being based on a row and column sum of pixels only within said target block;

searching a reference frame using said simplified signature block;

searching for a best match in an area centered around said target block in said reference frame using said simplified signature block;

computing a sum of an absolute pixel-by-pixel difference using motion vectors of said area, a neighbor above said target block, a neighbor left of said target block, and a zero motion vector;

selecting a new block with a motion vector with a minimum sum of said absolute pixel-by-pixel difference; and searching a new area centered around said new block for a minimum absolute difference match.

7. The method of claim 1, wherein said step of defining said simplified signature block includes the step of calculating a row sum of pixels of said target block.

8. The method of claim 1, wherein said step of defining said simplified signature block includes the step of calculating a column sum of pixels of said target block.

9. A heuristic based motion estimation system for video compression, said system comprising:

a first memory for storing a video clip;

means for accessing said video clip;

means for defining a target block within said video clip;

means for defining a simplified signature block from said target block, said simplified signature block being based on a row and column sum of pixels only within said target block;

means for searching a reference frame using said simplified signature block;

means for searching for a best match an area centered around said target block in said reference frame using said simplified signature block;

means for computing a sum of an absolute pixel-by-pixel difference using motion vectors of said area and a zero motion vector;

means for selecting a new block with a motion vector with a minimum sum of said absolute pixel-by-pixel difference;

means for searching a new area centered around said new block for a minimum absolute difference match to find a match of said target block;

means for estimating motion vectors of said match of said target block; and a second memory for storing said motion vectors of said match.

* * * * *